(12) United States Patent
Seki

(10) Patent No.: US 6,912,411 B1
(45) Date of Patent: Jun. 28, 2005

(54) EXTERNAL POWER SUPPLY CONTROL SYSTEM FOR CELLULAR PHONE

(75) Inventor: Shuichi Seki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 596 days.

(21) Appl. No.: 10/030,115

(22) PCT Filed: Jun. 9, 2000

(86) PCT No.: PCT/JP00/03786

§ 371 (c)(1),
(2), (4) Date: Jan. 23, 2002

(87) PCT Pub. No.: WO01/95456

PCT Pub. Date: Dec. 13, 2001

(51) Int. Cl.[7] .............................................. H04M 1/00
(52) U.S. Cl. ................. 455/572; 455/343.5; 455/343.2; 363/49; 363/50; 323/285
(58) Field of Search ................................ 455/572, 573, 455/343.5, 343.2, 343.6, 343.1; 363/19, 49, 50, 55, 142; 323/282, 284, 283, 288

(56) References Cited

U.S. PATENT DOCUMENTS

| | | |
|---|---|---|
| 5,479,330 A | 12/1995 | Bergk |
| 5,689,175 A | 11/1997 | Hanson et al. ................. 322/28 |
| 6,121,760 A | 9/2000 | Marshall et al. ............. 323/282 |
| 6,137,699 A | 10/2000 | Sakamoto ..................... 363/50 |
| 6,351,163 B1 | 2/2002 | Yoshizawa et al. ......... 327/142 |
| 6,363,146 B1 | 3/2002 | Aranovich et al. ......... 379/422 |
| 6,405,054 B1 | 6/2002 | Rozenblit et al. ........... 455/522 |
| 6,459,175 B1 | 10/2002 | Potega ....................... 307/149 |

FOREIGN PATENT DOCUMENTS

| | | |
|---|---|---|
| JP | 4-117140 | 4/1992 |
| JP | 09-130325 | 5/1997 |
| JP | 10-28069 | 1/1998 |

*Primary Examiner*—William Trost
*Assistant Examiner*—Danh Le
(74) *Attorney, Agent, or Firm*—Oblon, Spivak, McClelland, Maier & Neustadt, P.C.

(57) ABSTRACT

An external power source control system for a portable telephone includes: a regulator 5 connected at an input thereof to a battery power source 1 or an external power source 2 and outputting a power supply voltage; a one-shot pulse generating circuit 6 generating a one-shot pulse when the external power source 2 is connected to the portable telephone; a reset circuit 7 outputting a reset signal when the power supply voltage reaches a predetermined threshold level; and a controller maintaining an output of the power supply voltage from said regulator 5, based on the one-shot pulse, and canceling the maintenance of the output of the power supply voltage from said regulator 5, based on a predetermined instruction indicating that the power is not necessary.

11 Claims, 9 Drawing Sheets

EXTERNAL POWER SUPPLY CONTROL SYSTEM FOR CELLULAR PHONE

This application is the national phase under 35 U.S.C § 371 of PCT International Application No. PCT/JP00/03786, which has an International filing date of Jun. 09, 2000, which designated the United States of America.

TECHNICAL FIELD

The present invention relates to an external power source control system for a portable telephone for a public communications network and having a built-in charging function.

BACKGROUND ART

FIG. 1 is a block diagram showing a construction of a related-art external power control system for a portable telephone having a built-in charging function. Referring to FIG. 1, the external power control system comprises a terminal for a rechargeable battery pack 1 (hereinafter, referred to as battery power source) for operating the portable telephone, a terminal for an external power source 2 used to charge the battery-power source 1, a power key 3 of the portable telephone, a charging circuit 4 for charging the battery power source 1 by the external power source 2, a regulator 5 for receiving a voltage of the battery power source 1 or the external power source 2 at a Vin terminal and outputting a power supply voltage to the circuitry of the portable telephone via a Vout terminal, based on a logic level at an enable terminal (EN terminal), and a controller 10 for controlling the charging circuit 4 and the regulator 5.

The controller 10 comprises a charging controller 101 for controlling the charging circuit 4, a key detector 102 for detecting the depression of the power key 3, and a power maintaining unit 103 for bringing the EN terminal of the regulator 5 to a high level so as to maintain the level of the power supply voltage output from the regulator 5.

A description will now be given of the operation.

When only the battery power source 1 is connected to the portable telephone, i.e., when the external power source 2 is not connected to the portable telephone, an input voltage from the battery power source 1 is applied to the Vin terminal of the regulator 5.

In this state, the EN terminal of the regulator 5 is at a low level so that the regulator 5 does not supply the power supply voltage to the circuitry of the portable telephone via the Vout terminal.

When a user of the portable telephone depresses the power key 3, the power supply voltage is supplied to the circuitry of the portable telephone set so that the controller 10 is operated, as a result of the input voltage from the battery power source 1 being applied to the EN terminal of the regulator 5. The key detector 102 of the controller 10 detects the depression of the power key 3 and maintains the output of the power maintaining unit 103 at a high level using register access by a CPU (not shown). With this, the EN terminal of the regulator 5 is maintained at a high level. Accordingly, when the user of the portable telephone releases the power key 3, the power source maintaining unit 103 maintains the output of the regulator 5 so that power supply voltage of the portable telephone is prevented from being turned off.

The power supply voltage of the portable telephone is turned off by detecting the depression of the power key 3. The CPU uses a register access to bring the output of the power source maintaining unit 103 to a low level so that the output of the power supply to the circuitry of the portable telephone is turned off.

When the external power source 2 is connected to the portable telephone while the battery power source 1 is connected, the input voltage is applied to the Vin terminal of the regulator 5 and a voltage from the external power source 2 is applied to the EN terminal of the regulator 5. As a result, the power supply voltage is supplied from the Vout terminal of the regulator 5 to the circuitry of the portable telephone so that the controller 10 is operated.

The CPU (not shown) or an electronic circuit of the controller 10 monitors the status of the battery power source 1. By controlling the charging circuit 4 via the charging controller 101, the controller 10 operates to charge the battery power source 1 from the external power source 2. When the external power source 2 is connected to the portable telephone while the battery power source 1 is not connected, the same operation described above is performed except that the charging control is unnecessary.

In the above-described construction of the related-art external power source control system of the portable telephone, while the external power source 2 continues to supply the power to the portable telephone, the power supply voltage continues to be output via the Vout terminal of the regulator 5. Therefore, it is not possible to turn the power of the portable telephone off even when the power is no longer necessary.

When the portable telephone is used in a vehicle by using a car battery as the external power source 2, exhaustion of the car batter may be invited as a result of an electric current being wasted. When the domestic ac power source is used as the external power source 2, the user may have to incur unnecessary payment of electric bills.

The present invention has been developed in order to resolve the above-mentioned problems and has an objective of realizing an external power source control system designed to turn off, while the external power source 2 remains connected, the power supply voltage: when a charging operation is completed; when overflow of a timer, set to expire when a boost charge is completed so that the power is forced to be turned off, occurs; when a control program determines that the power need not be turned on; or when the user of the portable telephone determined that the power need not be turned on and performs required actions such as a key input and a speech input, the goals accomplished by the system being the suppression of a wasted electric current of the domestic ac power source, and reduction in electric current consumption.

DISCLOSURE OF THE INVENTION

An external power source control system for a portable telephone according to the present invention comprises: a regulator connected at an input thereof to a battery power source or an external power source and controlled to output a power supply voltage; a one-shot pulse generating circuit generating a one-shot pulse when the external power source is connected to the portable telephone; a reset circuit outputting a reset signal when the power supply voltage from the regulator reaches a predetermined threshold level; and a controller causing the regulator to output the power supply voltage, based on the one-shot pulse generated by the one-shot pulse generating circuit, maintaining an output of the power supply voltage from the regulator, based on the one-shot pulse generated by the one-shot pulse generating circuit, and canceling the maintenance of the output of the power supply voltage from the regulator, based on a predetermined instruction indicating that the power is not necessary.

Accordingly, there is provided an external power source control system for a portable telephone in which it is possible to turn off the power supply voltage while the external power source remains connected, exhaustion of a car battery is prevented, and waste of an electric current of the domestic ac power source is reduced.

The controller of the external power source control system for a portable telephone according to the present invention may comprise: a pulse generating circuit generating a pulse, based on the one-shot pulse generated by the one-shot pulse generating circuit and the reset signal output from the reset circuit; an RS latch having an output thereof set, based on the pulse generated by the pulse generating circuit; an OR circuit causing the regulator to output the power supply voltage, based on the one-shot pulse generated by the one-shot pulse generating circuit or the output set in the RS latch; and a register generating a pulse for resetting the RS latch when a write access to the register occurs as a result of the predetermined instruction indicating that the power is not necessary.

An advantage provided by the external power source control system for a portable telephone according to invention is that it is possible to turn off the power supply voltage while the external power source remains connected, exhaustion of a car battery is prevented, and waste of an electric current of the domestic ac power source is reduced.

The external power source control system for a portable telephone according to the present invention may further comprise a power key connected to the battery power source and causing the battery power to be output from the regulator, wherein the controller maintains the output of the power supply voltage from the regulator, based on the reset signal output from the reset circuit while the power key is being depressed.

The output of the power supply voltage started by the depression of the power key is maintained automatically by an electronic circuit without resorting to a register access from the CPU.

The controller of the external power source control system for a portable telephone according to the present invention may comprise: a first pulse generating circuit generating a first pulse, based on the one-shot pulse generated by the one-shot pulse generating circuit and the reset signal output from the reset circuit; a second pulse generating circuit generating a second pulse, based on the reset signal output from the reset circuit while the power key is being depressed; a first OR circuit receiving the first pulse generated by the first pulse generating circuit or the second pulse generated by the second pulse generating circuit, and providing one of the first pulse and the second pulse at an output of the first OR circuit; an RS latch having an output thereof set, based on one of the first pulse and the second pulse output from the first OR circuit; a second OR circuit for causing the regulator to output the power supply voltage, when one of the one-shot pulse generated by the one-shot pulse generating circuit and the output set in the RS latch occurs; and a register generating a pulse for resetting the RS latch when a write access to the register occurs as a result of a predetermined instruction indicating that the power is not necessary.

The output of the power supply voltage started by the depression of the power key is maintained automatically by an electronic circuit without resorting to a register access from the CPU.

The controller may cancels the maintenance of the output of the power supply voltage from the regulator when the power supply voltage drops below a predetermined threshold level so that the reset circuit no longer outputs the reset signal.

Therefore, the portable telephone could be operated only by the battery power source. When the battery voltage drops, the power supply to the portable telephone is automatically turned off.

The controller of the external power source control system for a portable telephone according to the present invention may comprise: a pulse generating circuit generating a pulse, based on the one-shot pulse generated by the one-shot pulse generating circuit and the reset signal output from the reset circuit; an RS latch having an output thereof set, based on the pulse generated by the pulse generating circuit; a second OR circuit for causing the regulator to output the power supply voltage, when one of the one-shot pulse generated by the one-shot pulse generating circuit and the output set in the RS latch occurs; a register generating a pulse when a write access to the register occurs as a result of a predetermined instruction indicating that the power is not necessary; and a third OR circuit resetting the RS latch, based on the pulse generated by the register, and also resetting the RS latch when the power supply voltage output from the regulator drops below a predetermined level so that the reset circuit no longer outputs the reset signal.

Therefore, the portable telephone could be operated only by the battery power source. When the battery voltage drops, the power supply to the portable telephone is automatically turned off.

An external power source control system for a portable telephone according to the present invention comprises: a regulator connected at an input thereof to a battery power source or an external power source and controlled to output a power supply voltage; a first reset circuit outputting a first reset signal when an input voltage, input as a result of the battery power source or the external power source being connected to a circuitry of the portable telephone, reaches a predetermined threshold level; a second reset circuit outputting a second reset signal when the power supply voltage output from the regulator reaches a predetermined threshold level; a clock generating circuit generating a clock when the battery power source or the external power source is connected to the circuitry of the portable telephone; and a controller causing the regulator to output the power supply voltage, based on the external power source, the reset signal output from the first reset circuit, the clock generated by the clock generating circuit, maintaining the output of the power supply voltage from the regulator, based on the external power source, the first reset signal output from the first reset circuit, the clock generated by the clock generating circuit, and canceling the maintenance of the power supply voltage from the regulator, based on a predetermined instruction indicating that the power is not necessary.

Accordingly, there is provided an external power source control system for a portable telephone in which it is possible to turn off the power supply voltage while the external power source remains connected, exhaustion of a car battery is prevented, and waste of an electric current of the domestic ac power source is reduced.

The controller of the external power source control system for a portable telephone according to the present invention may comprise: first and second flip-flops having an output thereof reset by the first reset signal output from the first reset circuit, and shifting a logic value of the external power source, based on the clock generated by the clock generating circuit; an AND circuit generating a one-shot pulse, based on the outputs from the first and second flip-flops; a pulse generating circuit generating a pulse, based on the one-shot pulse generated by said AND circuit and the second reset signal output from the second reset circuit; an RS latch having an output thereof set, based on the pulse generated by the pulse generating circuit; an OR circuit causing the regulator to output the power supply voltage, based on the one-shot pulse generated by the AND circuit or the output set in the RS latch; and a register generating a pulse for resetting the RS latch when a write access to the register occurs as a result of a predetermined instruction indicating that the power is not necessary.

Accordingly, there is provided an external power source control system for a portable telephone in which it is possible to turn off the power supply voltage while the external power source remains connected, exhaustion of a car battery is prevented, and waste of an electric current of the domestic ac power source is reduced.

The controller of the external power source controller for a portable telephone according to the present invention may comprise: first, second and third flip-flops having an output thereof reset by the first reset signal output from the first reset circuit, and shifting a logic value of the external power source, based on the clock generated by the clock generating circuit; an AND circuit generating a one-shot pulse, based on the outputs from the first, second and third flip-flops;.-a pulse generating circuit generating a pulse, based on the one-shot pulse generated by said AND circuit and the second reset signal output from the second reset circuit; an RS latch having an output thereof set, based on the pulse generated by the pulse generating circuit; an OR circuit causing the regulator to output the power supply voltage, based on the one-shot pulse generated by the AND circuit or the output set in the RS latch; and a register generating a pulse for resetting the RS latch when a write access to the register occurs as a result of a predetermined instruction indicating that the power is not necessary.

Therefore, chattering that may occur when the external power source is connected to the circuitry of the portable telephone is canceled.

The external power source control system for a portable telephone according to the present invention may further comprise a power key connected to the battery power source and causing the battery power to be output from the regulator, wherein the controller maintains the output of the power supply voltage from the regulator, based on the second reset signal output from the second reset circuit while the power key is being depressed.

Therefore, the output of the power supply voltage started by the depression of the power key is maintained automatically by an electronic circuit without resorting to a register access from the CPU.

The controller of the external power source control system for a portable telephone according to the present invention may cancel the maintenance of the output of the power supply voltage from the regulator when the power supply voltage drops below a predetermined threshold level so that the second reset circuit no longer outputs the second reset signal.

Therefore, the portable telephone could be operated only by the battery power source. When the battery voltage drops, the power supply to the portable telephone is automatically turned off.

BEST MODE FOR CARRYING OUT THE INVENTION

A detailed description of the invention will be given by describing the best mode for carrying out invention with reference to the attached drawings.

First Embodiment

Figure 1:
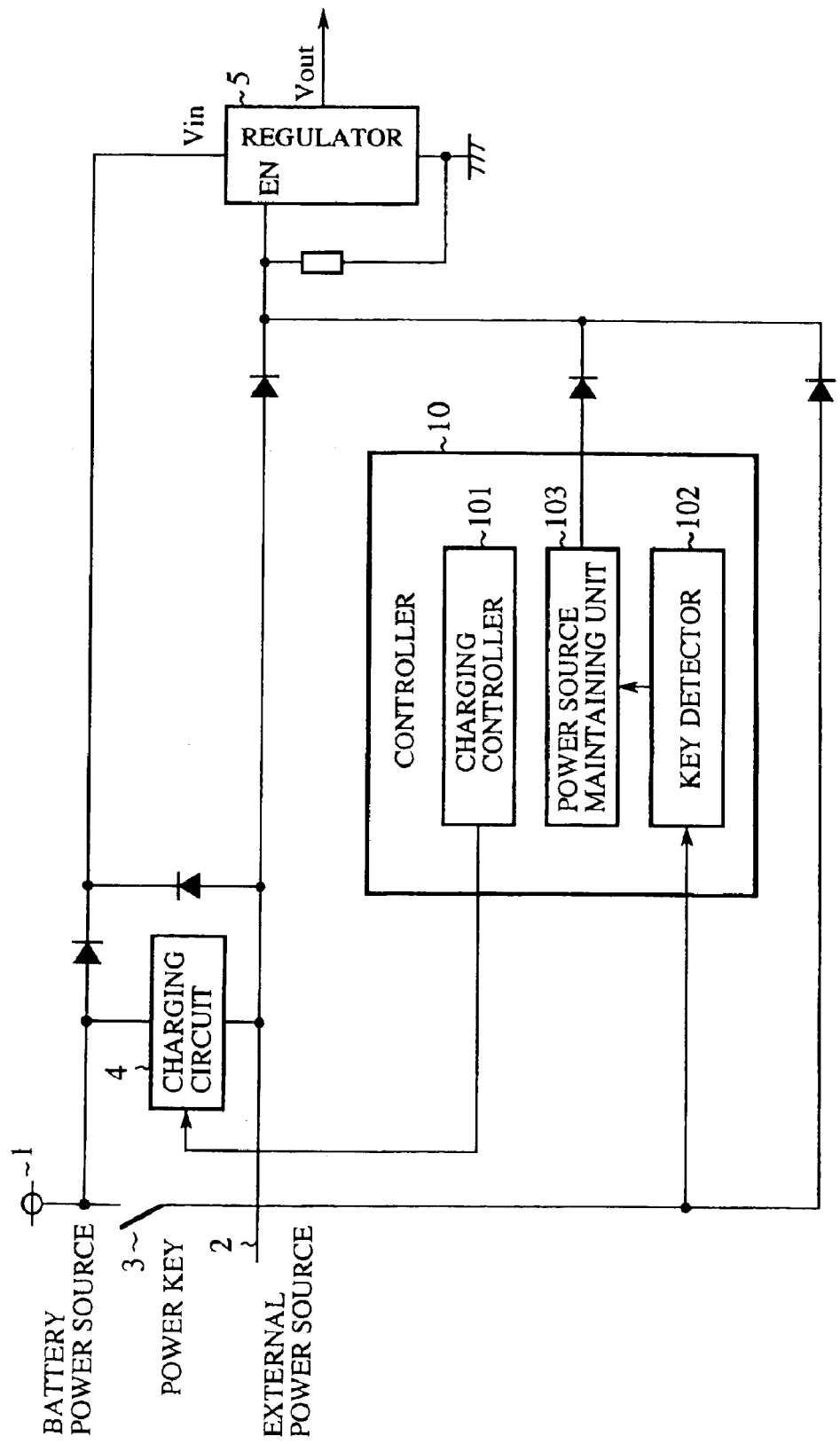
FIG. 1 is a block diagram showing a construction of a related-art external power source control system for a portable telephone.
Figure 2:
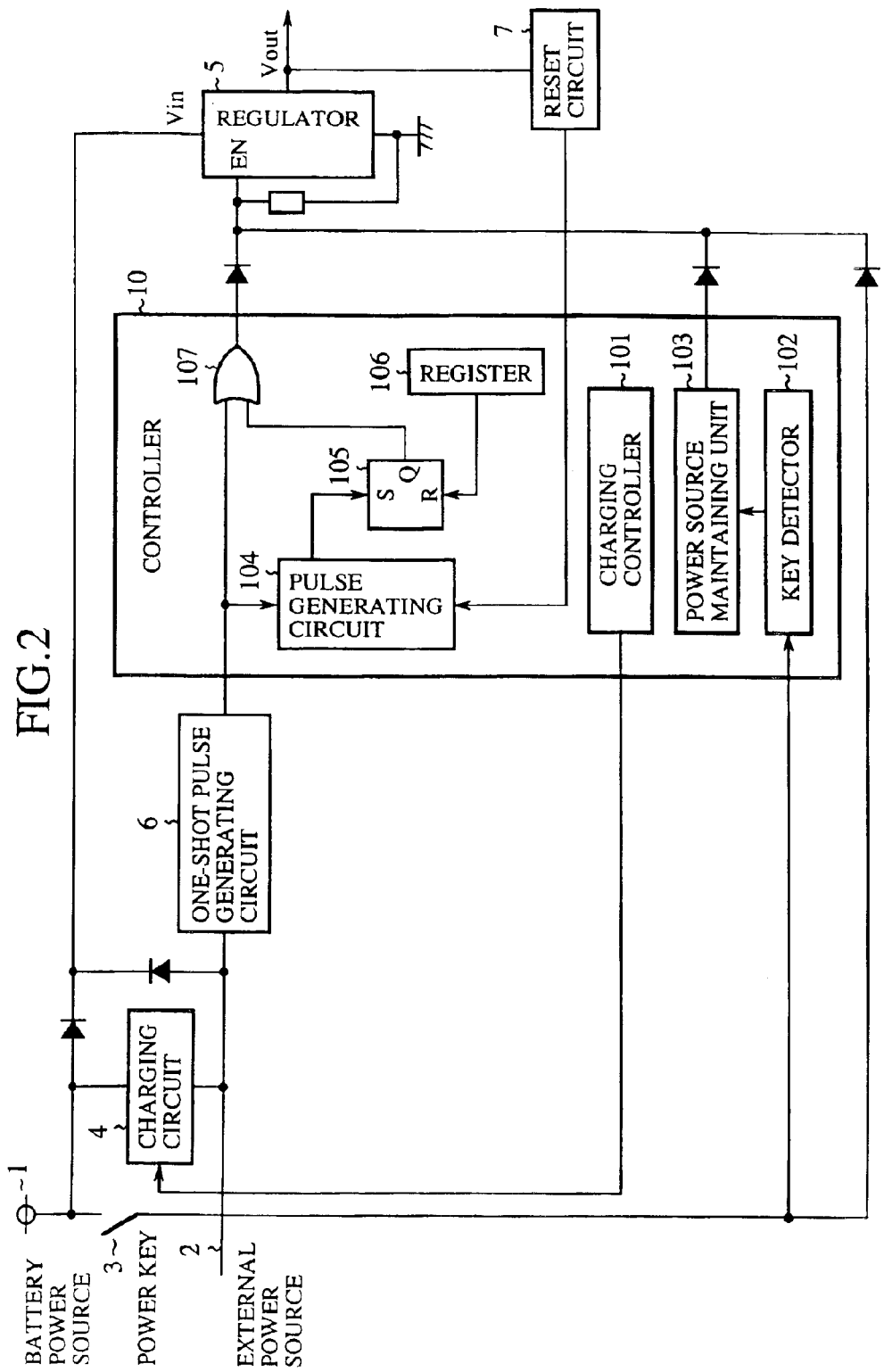
FIG. 2 is a block diagram showing a construction of an external power source control system for a portable telephone according to a first embodiment.

FIG. 2 is a block diagram showing a construction of an external power source control system for a portable telephone according to a second embodiment. Referring to FIG. 2, the external power source control system comprises, in a similar configuration as the related art, a battery power source 1, an external power source 2, a power key 3, a charging circuit 4, a regulator 5, a charging controller 101, a key detector 102, and a power maintaining unit 103.

Reference numeral 6 indicates a one-shot pulse generating circuit for generating a one-shot pulse to the controller 10 when the external power source 2 is connected to the portable telephone, 7 indicates a reset circuit (second reset circuit) for generating a reset signal (second reset signal) at a high level when the output of the power supply voltage from the regulator 5 reaches a threshold level. The reset circuit 7 may be implemented by a reset IC. Alternatively, an input buffer (not shown) of the controller 10 may be implemented by a Schmidt trigger so that power-on reset is performed.

The controller 10 comprises: a pulse generating circuit 104 (first pulse generating circuit) for generating a pulse (first pulse) when detecting a rising edge of the reset signal from the reset circuit 7 while the one-shot pulse from the one-shot pulse generating circuit 6 is at a high level; an RS latch 105 for setting an output thereof at a high level upon receiving the pulse from the pulse generating circuit 104; a register 106 for generating a pulse for resetting the RS latch 105 when a CPU (not shown) in the controller 10 performs a write access to the register 106; and an OR circuit 107 (second OR circuit) for generating a high-level output signal when the one-shot pulse from the one-shot pulse generating circuit 6 or the high-level signal from the RS latch 105 is received.

A description will now be given of the operation.

Figure 3:
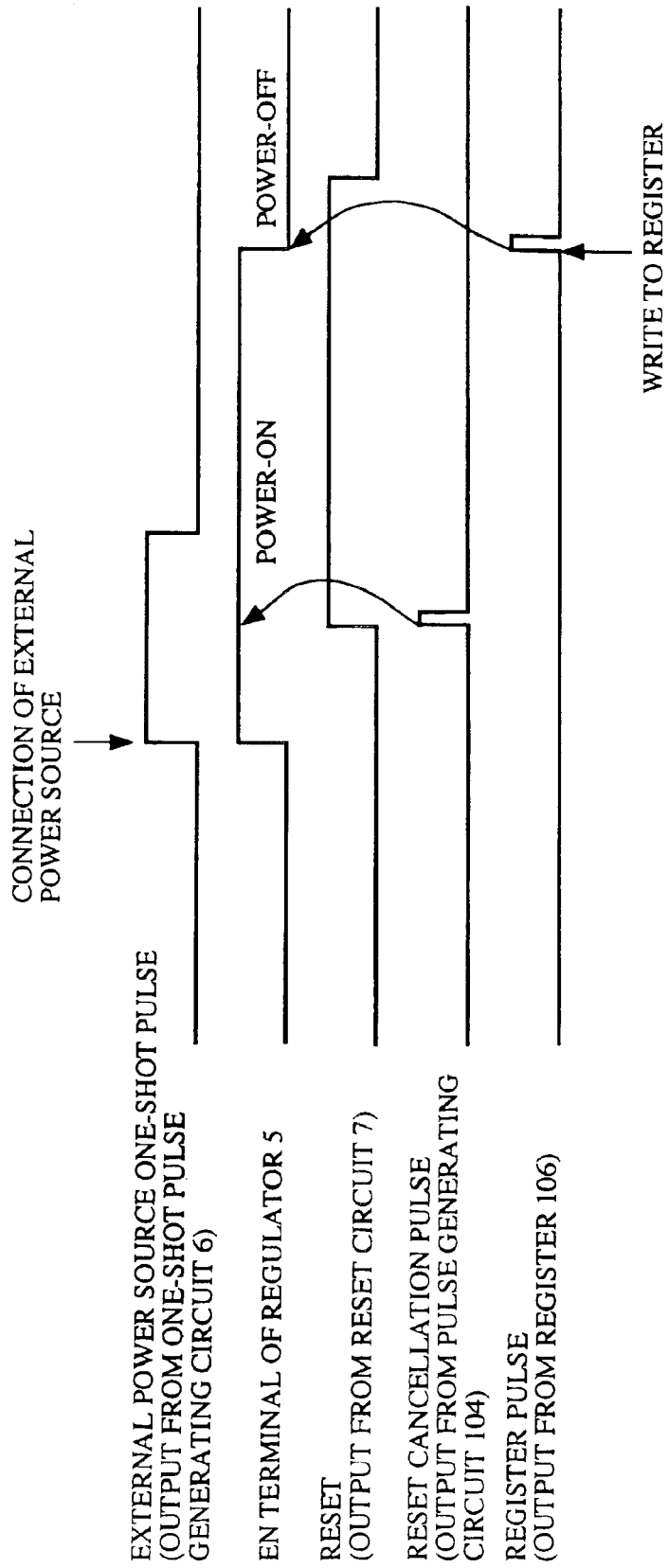
FIG. 3 is a timing chart showing an operation of the external power source control system for a portable telephone according to the first embodiment.

FIG. 3 is a timing chart showing an operation of the external power source control system for a portable telephone according to the first embodiment. When the external power source 2 is connected to the portable telephone while the portable telephone is connected to the battery power source 1, the one-shot pulse generating circuit 6 generates an external power source one-shot pulse at a high level. When the power supply voltage, output via the Vout terminal of the regulator 5 while the one-shot pulse remains at a high level, reaches a threshold level, the reset signal at a high level is generated by the reset circuit 7 so that a reset cancellation pulse is generated by the pulse generating circuit 104. The reset cancellation pulse causes the output of the RS latch 105 to be set at a high level. Even when the external power source one-shot pulse from the one-shot pulse generating circuit goes low, the EN terminal of the regulator 5 is maintained at a high level so that the power supply voltage from the Vout terminal is maintained.

A description will now be given of how the power supply voltage is turned off while the external power source 2 remains connected. Given that the external power source one-shot pulse from the one-shot pulse generating circuit 6 is at a low level, the CPU (not shown) in the controller 10 performs a write access to the register 106 when the control program determines that the power need not be turned on as a result of the completion of the charging operation or a timer overflow. The CPU also accesses the register 106 when the user of the portable telephone determines that the power need not be turned on and performs a certain action such as a key input and a speech input. A register pulse generated as a result of the CPU access causes the output of the RS latch to be cleared so that the EN terminal of the regulator 5 is brought to a low level and the power supply voltage is turned off.

The foregoing description assumes that the external power source 2 is connected while the battery power source 1 is connected to the portable telephone. A similar operation is performed when the external power source 2 is connected while the battery power source 1 is not connected.

Thus, the first embodiment brings into reality an external power source control system for a portable telephone in which it is possible to turn off the power supply voltage while the external power source 2 remains connected, exhaustion of a car battery is prevented, and waste of an electric current of the domestic ac power source is reduced.

Second Embodiment

Figure 4:
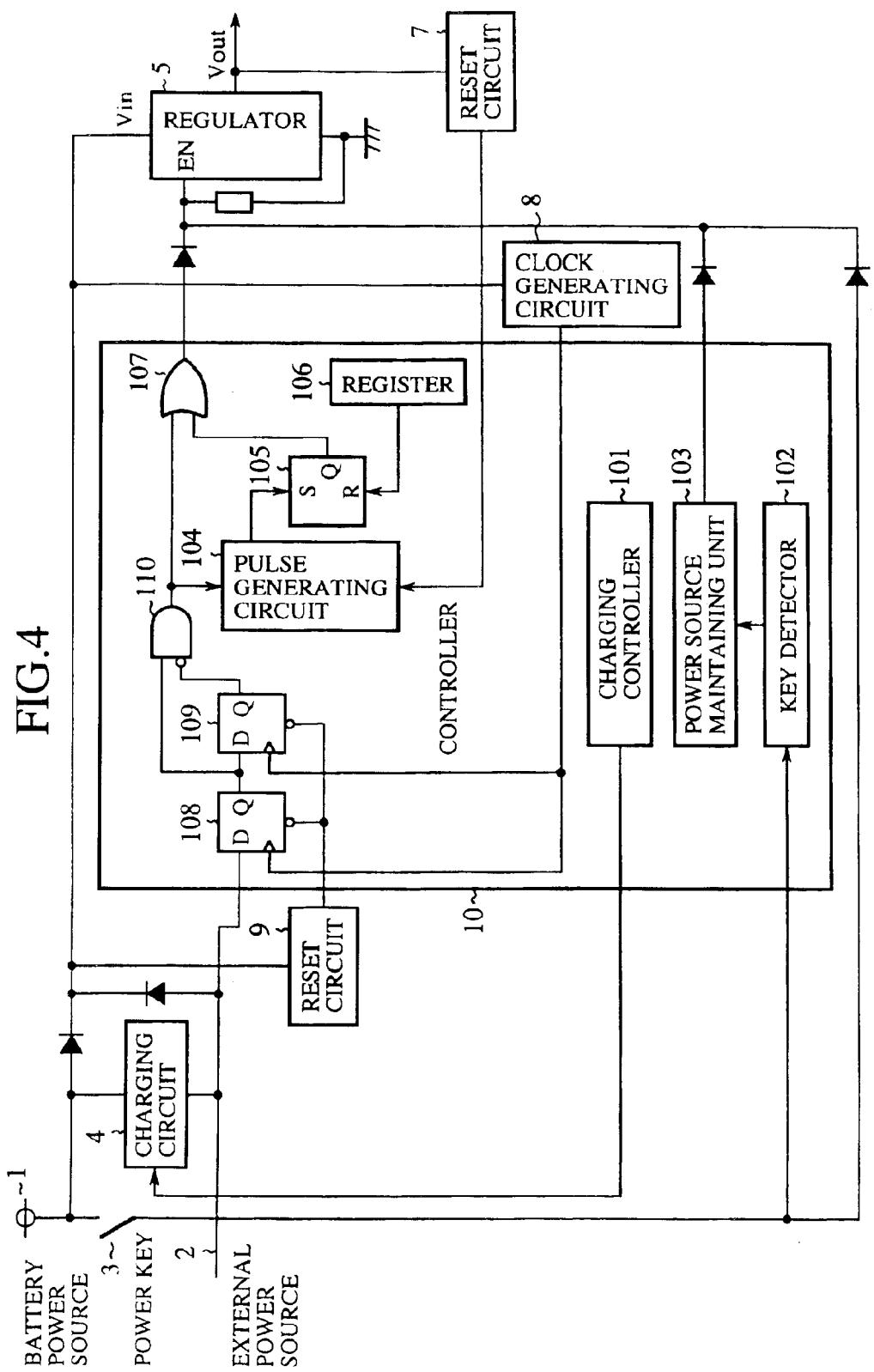
FIG. 4 is a block diagram showing a construction of an external power source control system for a portable telephone according to a second embodiment.

FIG. 4 is a block diagram showing a construction of an external power source control system for a portable telephone according to a second embodiment. Those components of the system according to the second embodiment that are identical to the corresponding components of the first embodiment shown in FIG. 2 are designated by the same reference numerals and the description thereof is omitted. Referring to FIG. 4, numeral 8 indicates a clock generating circuit for generating a clock when the battery power source 1 or the external power source 2 is connected to the portable telephone, 9 indicates a reset circuit (first reset circuit) for generating a reset signal (first reset signal) when a voltage input thereto reaches a threshold level as a result of the battery power source 1 or the external power source 2 being connected to the portable telephone. The reset circuit 9 may be implemented by a reset IC. Alternatively, an input buffer (not shown) of the controller 10 may be implemented by a Schmidt trigger so that power-on reset is performed.

The controller 100 comprises flip-flops (first flip-flop and second flip-flop) 108 and 109 for shifting a logic value of the external power source 2 in synchronization with the clock from the clock generating circuit 8 when the external power source 2 is connected to the portable telephone. The two flip-flops 108 and 109 constitute a shift register. Reference numeral 110 indicates an AND circuit for generating a one-shot pulse depending on logic values of the flip-flops 108 and 109.

The clock generating circuit 8 includes a frequency-divider (not shown) for obtaining a suitable period of sampling effected by the flip-flops 108 and 109.

A description will now be given of the operation.

Figure 5:
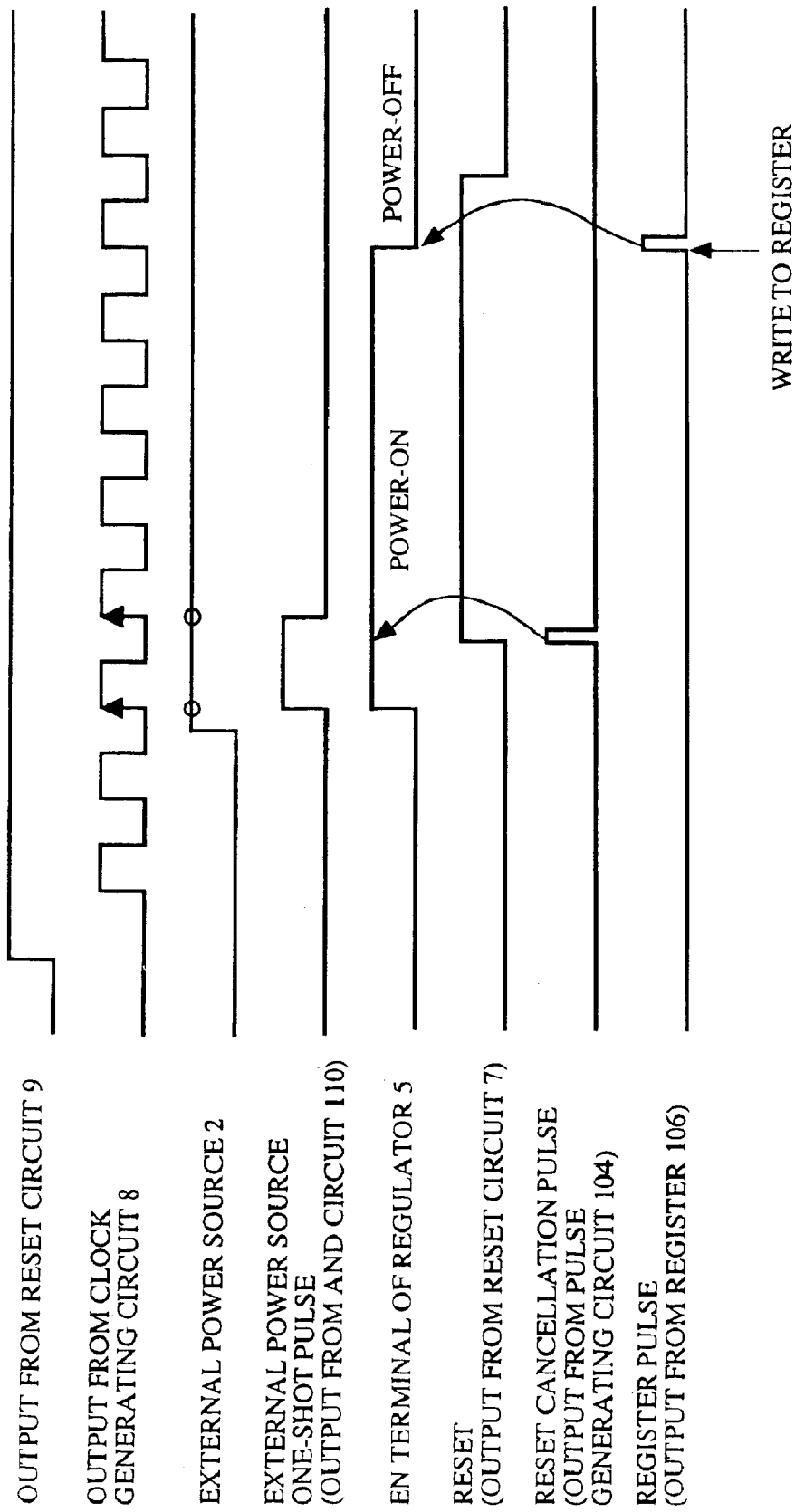
FIG. 5 is a timing chart showing an operation of the external power source control system for a portable telephone according to the second embodiment.

FIG. 5 is a timing chart showing an operation of the external power source control system for a portable telephone according to the second embodiment. When the battery power source 1 is connected to the portable telephone, the reset circuit 9 operates so that the reset signal resets the outputs of the flip-flops 108 and 109. In this state, the clock generating circuit 8 has started supplying the clock to the flip-flops 108 and 109.

When the external power source 2 is connected, the signal of the external power source 2 input to the flip-flop 108 is sampled in synchronization with the clock from the clock generating circuit 8. When the flip-flop 108 outputs a high level and the flip-flop 109 outputs a low level, the AND, circuit 110 outputs a high level. The subsequent operation conducive to the maintaining of the power supply voltage output from the regulator 5 is the same as that of the first embodiment.

Sampling by the next clock generated by the clock generating circuit 8 causes the flip-flops 108 and 109 to output a high level, causing the output of the AND circuit 110 to go low. In a similar configuration as the first embodiment, the power supply voltage may be turned off while the external power source 2 remains connected by the CPU (not shown) in the controller 10 performing a write access to the register 106.

The foregoing description assumes that the external power source 2 is connected while the battery power source 1 is connected to the portable telephone. A similar operation is performed when the external power source 2 is connected while the battery power source 1 is not connected.

Thus, the second embodiment brings into reality an external power source control system for a portable telephone in which it is possible to turn off the power supply voltage while the external power source 2 remains connected, exhaustion of a car battery is prevented, and waste of an electric current of the domestic ac power source is reduced.

Third Embodiment

Figure 6:
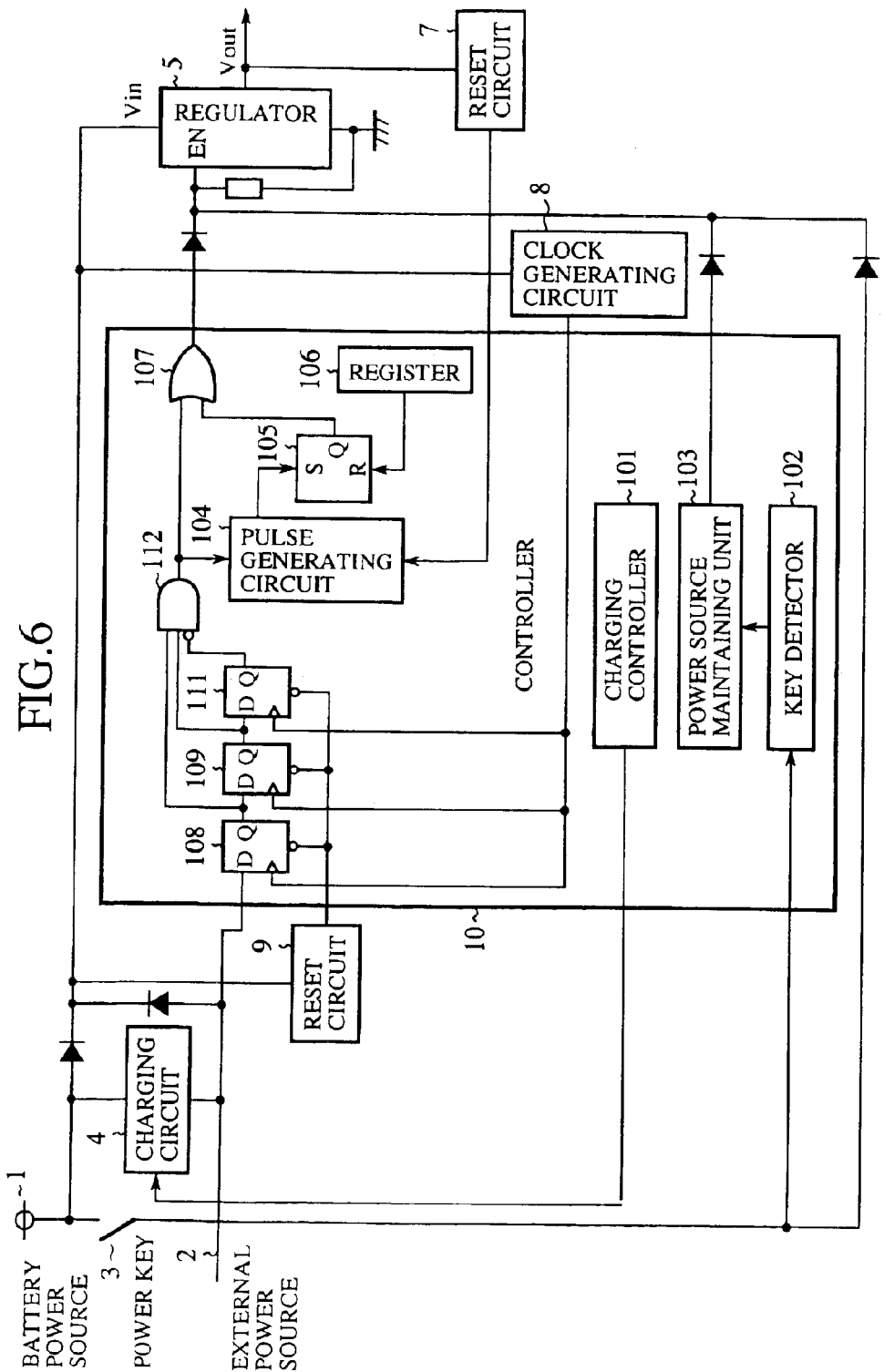
FIG. 6 is a block diagram showing a construction of an external power source control system for a portable telephone according to a third embodiment.

FIG. 6 is a block diagram showing a construction of an external power source control system for a portable telephone according to a third embodiment. Those components of the system according to the third embodiment that are identical to the corresponding components of the second embodiment shown in FIG. 4 are designated by the same reference numerals and the description thereof is omitted. Referring to FIG. 6, the controller 10 comprises a flip-flop (third flip-flop) 111 operating in combination with the flip-flops 108 and 109 to shift a logic value of the external power source 2 in synchronization with the clock from the clock generating circuit 8 when the external power source 2 is connected to the portable telephone. The three flip-flops 108, 109 and 111 constitute a shift register. Reference numeral 112 indicates an AND circuit for generating a one-shot pulse depending on the logic values from the flip-flops 108, 109 and 110.

The third embodiment is adapted for cancellation of chattering that may occur when the external power source 2, using three flip-flops. For the purpose of improving the chattering cancellation performance, a shift register constituted by four or more flip-flops may be used.

A description will now be given of the operation.

Figure 7:
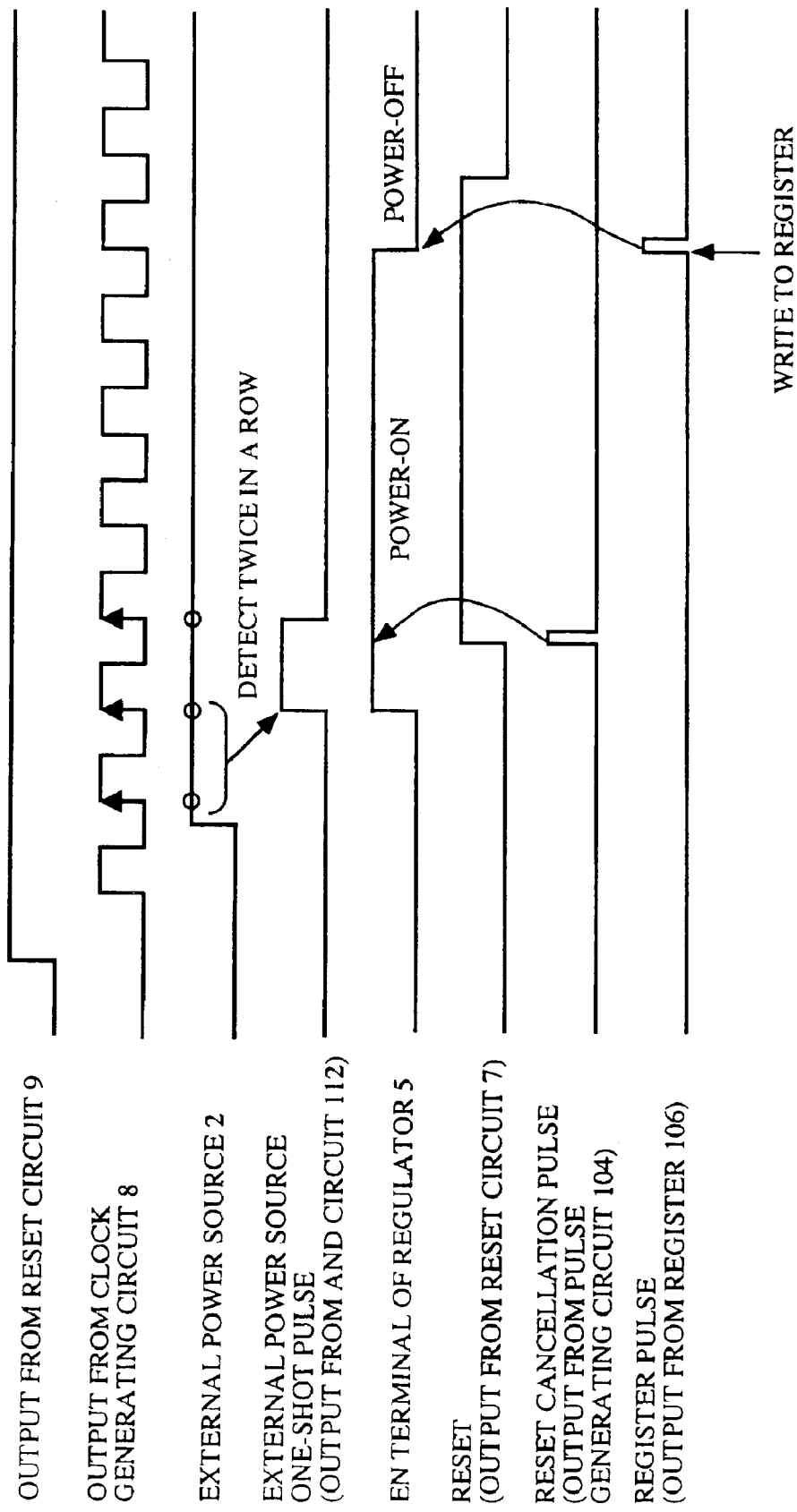
FIG. 7 is a timing chart showing an operation of the external power source control system for a portable telephone according to the third embodiment.

FIG. 7 is a timing chart showing an operation of the external power source control system for a portable telephone according to the third embodiment. In contrast to the second embodiment, where the power supply voltage is turned on immediately after the flip-flop 108 outputs a high level and the flip-flop 109 outputs a low level, the output of the power supply voltage is deferred according to the third embodiment until the flip-flop 108 outputs a high level, the flip-flop 109 outputs a high level and the flip-flop ill outputs a low level, i.e. until two clocks from the clock generating circuit 108 are successively detected. With this, chattering caused by connection of the external power source 2 is cancelled. The other aspects of the third embodiment are the same as the corresponding aspects according to the second embodiment.

Thus, the third embodiment brings into reality an external power source control system for a portable telephone in which it is possible to turn off the power supply voltage while the external power source 2 remains connected, exhaustion of a car battery is prevented, and waste of an electric current of the domestic ac power source is reduced.

Fourth Embodiment

Figure 8:
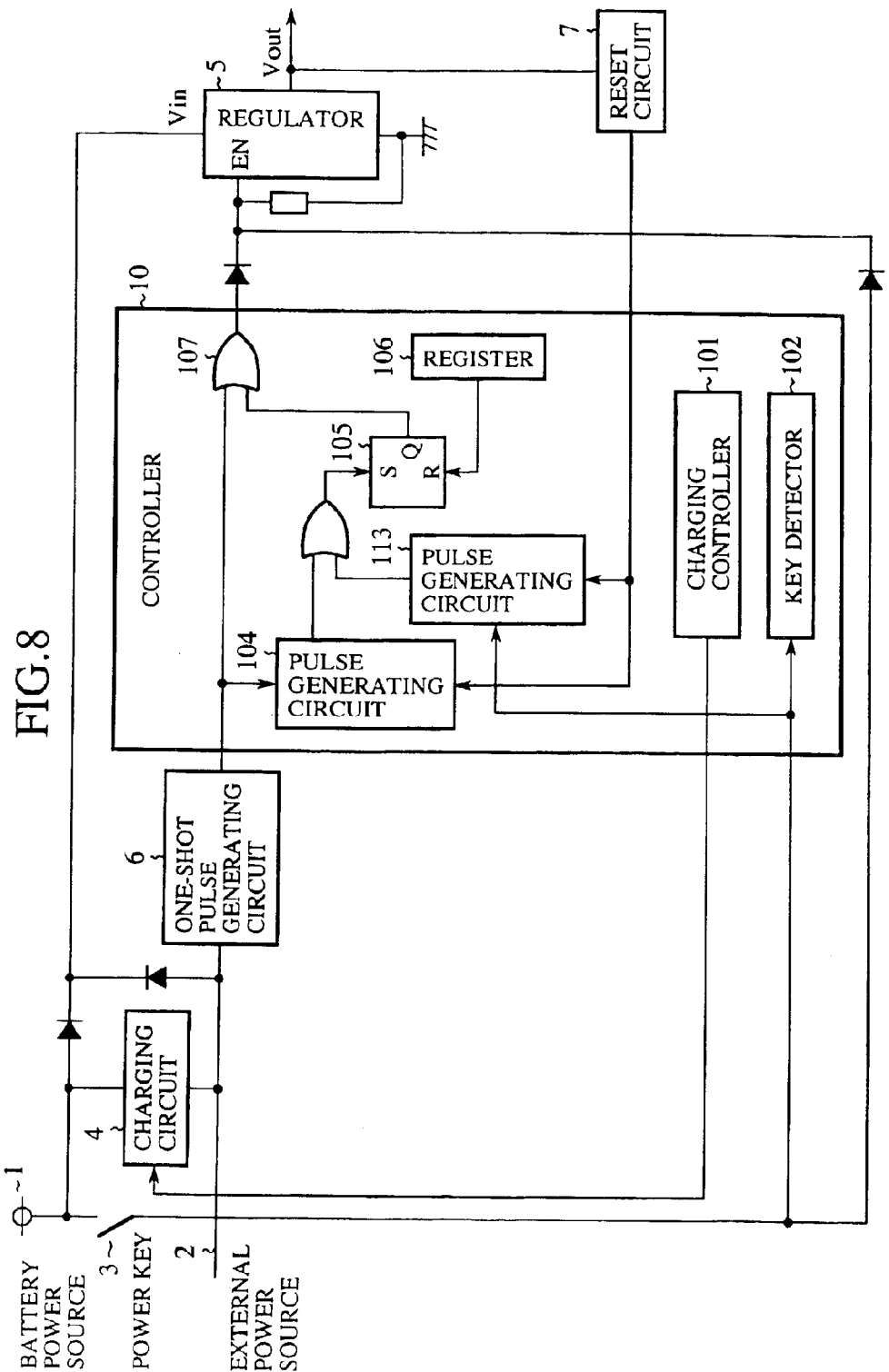
FIG. 8 is a block diagram showing a construction of an external power source control system for a portable telephone according to a fourth embodiment.

FIG. 8 is a block diagram showing a construction of an external power source control system for a portable telephone according to a fourth embodiment. Those components of the system according to the fourth embodiment that are identical to the corresponding components of the first embodiment shown in FIG. 2 are designated by the same reference numerals and the description thereof is omitted. Referring to FIG. 8, the controller 10 comprises a pulse generating circuit 113 for outputting a pulse (second pulse) when a rising edge of the reset signal from the reset circuit 7 is detected while the power key 3 is maintained in an on state. The controller 10 further comprises an OR circuit (first OR circuit) 114 forwarding the output from the pulse generating circuit 104 or the output from the pulse generating circuit 113 to the RS latch 105.

The pulse generating circuit 113 may output a pulse immediately following an input of the reset signal from the reset circuit 7. Alternatively, a certain delay time may be introduced so as to prevent the portable telephone from being turned on by depressing the power key 3 for only a short period of time.

In the fourth embodiment, the pulse generating circuit 113 and the OR circuit 114 are introduced in addition to the construction according to the first embodiment shown in FIG. 2. Alternatively, the pulse generating circuit 113 and the OR circuit 114 may be introduced in the construction according to the second embodiment shown in FIG. 4 or the construction according to the third embodiment shown in FIG. 6.

With this construction, the power supply from the battery power source 1 is maintained in a similar configuration as the external power source 2. That is, the output of the power supply voltage started by the depression of the power key 3 is maintained automatically by an electronic circuit without resorting to a register access from the CPU. The only requirement for turning-off of the power of the portable telephone is to provide the register 106.

The same description as given in the first embodiment applies to the operation of maintaining the output of the power supply voltage when the external power supply 2 is connected and the operation of turning the output of the power supply off while the external power source 2 remains connected.

Thus, the fourth embodiment brings into reality an external power source control system for a portable telephone in which it is possible to turn off the power supply voltage while the external power source 2 remains connected, exhaustion of a car battery is prevented, and waste of an electric current of the domestic ac power source is reduced. Additional advantages are that the output of the power supply voltage started by the depression of the power key 3 is maintained automatically by an electronic circuit without resorting to a register access from the CPU.

Fifth Embodiment

Figure 9:
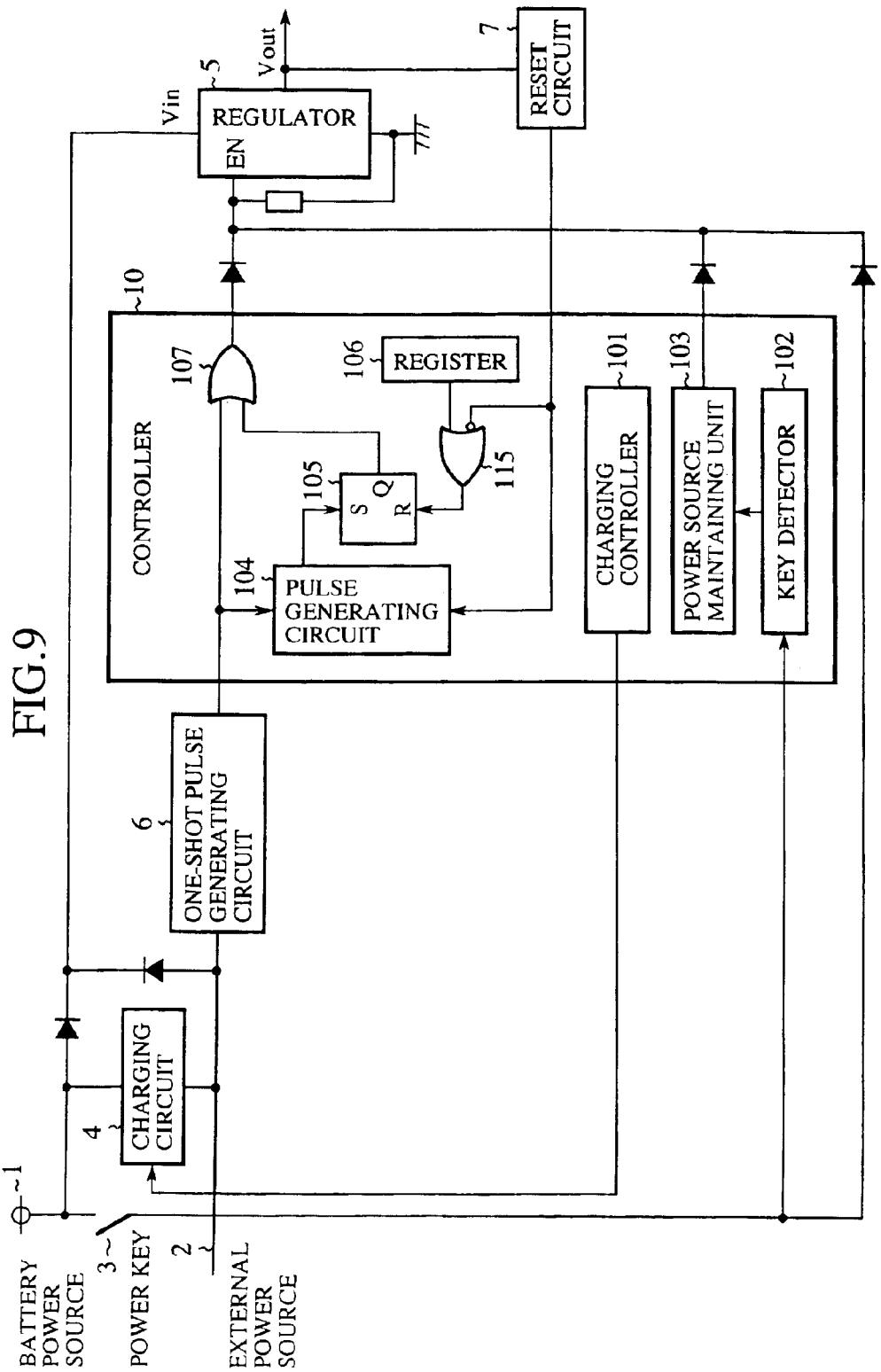
FIG. 9 is a block diagram showing a construction of an external power source control system for a portable telephone according to a fifth embodiment.

FIG. 9 is a block diagram showing a construction of an external power source control system for a portable telephone according to a fifth embodiment. Those components of the system according to the fifth embodiment that are identical to the corresponding components of the first embodiment shown in FIG. 2 are designated by the same reference numerals and the description thereof is omitted. Referring to FIG. 9, the controller 10 comprises an OR circuit 115 (third OR circuit) receiving a signal from the register 106 occurring as a result of a register write operation, and the reset signal from the reset circuit 7. The OR circuit 115 outputs a signal for resetting the RS latch 105 depending on the inputs.

In the fifth embodiment, the OR circuit 115 is added to the construction according to the first embodiment shown in Fi. 2. Alternatively, the OR circuit 115 may be added to the construction according to the second embodiment shown in FIG. 4 and the construction according to the third embodiment shown in FIG. 6.

With this construction, when the battery voltage drops while the portable telephone is being operated only by the battery power source 1, the output of the reset circuit 7 goes low so that the output of the RS latch is cleared. Thus, the output of the power supply voltage of the portable telephone is automatically turned off without a write access from the CPU to the register 106.

The same description as given in the first embodiment applies to the operation of maintaining the output of the power supply voltage when the external power supply 2 is connected and the operation of turning the output of the power supply off while the external power source 2 remains connected.

Thus, the fifth embodiment brings into reality an external power source control system for a portable telephone in which it is possible to turn off the power supply voltage while the external power source 2 remains connected, exhaustion of a car battery is prevented, and waste of an electric current of the domestic ac power source is reduced.

INDUSTRIAL APPLICABILITY

As described above, the external power source control system according to the present invention is adapted for turning off the output of the power supply voltage of the portable telephone while the external power source 2 remains connected.

What is claimed is:

1. An external power source control system for a portable telephone comprising:

a regulator connected at an input thereof to a battery power source or an external power source and controlled to output a power supply voltage;

a one-shot pulse generating circuit generating a one-shot pulse when the external power source is connected to the portable telephone;

a reset circuit outputting a reset signal when the power supply voltage from said regulator reaches a predetermined threshold level; and a controller causing said regulator to output the power supply voltage, based on the one-shot pulse generated by said one-shot pulse generating circuit, maintaining an output of the power supply voltage from said regulator, based on the one-shot pulse generated by said one-shot pulse generating circuit, and canceling the maintenance of the output of the power supply voltage from said regulator, based on a predetermined instruction indicating that the power is not necessary.

2. The external power source control system for a portable telephone according to claim 1, wherein said controller comprises:

a pulse generating circuit generating a pulse, based on the one-shot pulse generated by said one-shot pulse generating circuit and the reset signal output from said reset circuit;

an RS latch having an output thereof set, based on the pulse generated by said pulse generating circuit;

an OR circuit causing said regulator to output the power supply voltage, based on the one-shot pulse generated by said one-shot pulse generating circuit or the output set in the RS latch; and a register generating a pulse for resetting the RS latch when a write access to said register occurs as a result of the predetermined instruction indicating that the power is not necessary.

3. The external power source control system for a portable telephone according to claim 1, further comprising a power key connected to the battery power source and causing the battery power to be output from said regulator, wherein said controller maintains the output of the power supply voltage from said regulator, based on the reset signal output from said reset circuit while the power key is being depressed.

4. The external power source control system for a portable telephone according to claim 3, wherein said controller comprises:

a first pulse generating circuit generating a first pulse, based on the one-shot pulse generated by said one-shot pulse generating circuit and the reset signal output from said reset circuit;

a second pulse generating circuit generating a second pulse, based on the reset signal output from said reset circuit while the power key is being depressed;

a first OR circuit receiving the first pulse generated by said first pulse generating circuit or the second pulse generated by said second pulse generating circuit, and providing one of the first pulse and the second pulse at an output of said first OR circuit;

an RS latch having an output thereof set, based on one of the first pulse and the second pulse output from said first OR circuit;

a second OR circuit for causing said regulator to output the power supply voltage, when one of the one-shot pulse generated by said one-shot pulse generating circuit and the output set in the RS latch occurs; and a register generating a pulse for resetting the RS latch when a write access to said register occurs as a result of a predetermined instruction indicating that the power is not necessary.

5. The external power source control system for a portable telephone according to claim 1, wherein said controller cancels the maintenance of the output of the power supply voltage from said regulator when the power supply voltage drops below a predetermined threshold level so that said reset circuit no longer outputs the reset signal.

6. The external power source control system for a portable telephone according to claim 5, wherein said controller comprises:

a pulse generating circuit generating a pulse, based on the one-shot pulse generated by said one-shot pulse generating circuit and the reset signal output from said reset circuit;

an RS latch having an output thereof set, based on the pulse generated by said pulse generating circuit;

a second OR circuit for causing said regulator to output the power supply voltage, when one of the one-shot pulse generated by said one-shot pulse generating circuit and the output set in the RS latch occurs;

a register generating a pulse when a write access to said register occurs as a result of a predetermined instruction indicating that the power is not necessary; and a third OR circuit resetting the RS latch, based on the pulse generated by said register, and also resetting said RS latch when the power supply voltage output from said regulator drops below a predetermined level so that said reset circuit no longer outputs the reset signal.

7. An external power source control system for a portable telephone, comprising:

a regulator connected at an input thereof to a battery power source or an external power source and controlled to output a power supply voltage;

a first reset circuit outputting a first reset signal when an input voltage, input as a result of the battery power source or the external power source being connected to a circuitry of the portable telephone, reaches a predetermined threshold level;

a second reset circuit outputting a second reset signal when the power supply voltage output from said regulator reaches a predetermined threshold level;

a clock generating circuit generating a clock when the battery power source or the external power source is connected to the circuitry of the portable telephone; and a controller causing said regulator to output the power supply voltage, based on the external power source, the reset signal output from said first reset circuit, the clock generated by said clock generating circuit, maintaining the output of the power supply voltage from said regulator, based on the external power source, the first reset signal output from said first reset circuit, the clock generated by said clock generating circuit, and canceling the maintenance of the power supply voltage from said regulator, based on a predetermined instruction indicating that the power is not necessary.

8. The external power source control system for a portable telephone according to claim 7, wherein said controller comprises:

first and second flip-flops having an output thereof reset by the first reset signal output from said first reset circuit, and shifting a logic value of the external power source, based on the clock generated by said clock generating circuit;

an AND circuit generating a one-shot pulse, based on the outputs from said first and second flip-flops;

a pulse generating circuit generating a pulse, based on the one-shot pulse generated by said AND circuit and the second reset signal output from said second reset circuit;

an RS latch having an output thereof set, based on the pulse generated by said pulse generating circuit;

an OR circuit causing said regulator to output the power supply voltage, based on the one-shot pulse generated by said AND circuit or the output set in the RS latch; and a register generating a pulse for resetting the RS latch when a write access to said register occurs as a result of a predetermined instruction indicating that the power is not necessary.

9. The external power source control system for a portable telephone according to claim 7, wherein said controller comprises:

first, second and third flip-flops having an output thereof reset by the first reset signal output from said first reset circuit, and shifting a logic value of the external power source, based on the clock generated by said clock generating circuit;

an AND circuit generating a one-shot pulse, based on the outputs from said first, second and third flip-flops;

a pulse generating circuit generating a pulse, based on the one-shot pulse generated by said AND circuit and the second reset signal output from said second reset circuit;

an RS latch having an output thereof set, based on the pulse generated by said pulse generating circuit;

an OR circuit causing said regulator to output the power supply voltage, based on the one-shot pulse generated by said AND circuit or the output set in the RS latch; and a register generating a pulse for resetting the RS latch when a write access to said register occurs as a result of a predetermined instruction indicating that the power is not necessary.

10. The external power source control system for a portable telephone according to claim 7, further comprising a power key connected to the battery power source and causing the battery power to be output from said regulator, wherein said controller maintains the output of the power supply voltage from said regulator, based on the second reset signal output from said second reset circuit while the power key is being depressed.

11. The external power source control system for a portable telephone according to claim 7, wherein said controller cancels the maintenance of the output of the power supply voltage from said regulator when the power supply voltage drops below a predetermined threshold level so that said second reset circuit no longer outputs the second reset signal.

* * * * *